United States Patent [19]
Thompson

[11] 3,814,189
[45] June 4, 1974

[54] GRASS TRIMMER
[75] Inventor: William W. Thompson, Phoenix, Ariz.
[73] Assignee: Mary G. Niven, Phoenix, Ariz.
[22] Filed: Dec. 26, 1972
[21] Appl. No.: 318,018

[52] U.S. Cl.............. 172/13, 172/111, 30/DIG. 7
[51] Int. Cl........................................... A01b 45/00
[58] Field of Search.......... 172/11, 14, 13, 41, 111; 30/DIG. 7

[56] References Cited
UNITED STATES PATENTS

| | | | |
|---|---|---|---|
| 1,857,383 | 5/1932 | Johnson | 30/DIG. 7 |
| 2,733,100 | 1/1956 | Simonsen | 17/13 UX |
| 2,991,838 | 7/1961 | Lane | 172/111 X |
| 3,143,176 | 8/1964 | Drane | 172/13 X |
| 3,554,293 | 1/1971 | Aman et al. | 172/13 |

Primary Examiner—Stephen C. Pellegrino
Attorney, Agent, or Firm—Cahill, Sutton & Thomas

[57] ABSTRACT

Apparatus is disclosed for cutting a swath of vegetation adjacent watering system sprinkler heads. An open framework houses rotatable cutting blades and positions the cutting blades relative to the sprinkler head. The cutting blades are non-rotatably secured to a shaft, which shaft extends from the open framework. A bushing is disposed intermediate the shaft and the open framework to permit axial movement and rotation therebetween. The mechanism by which the cutting blades are secured to the shaft permits the internal and external diameter of the swath to be varied. The mechanism further includes means for cutting a less than full circle swath about the sprinkler head where the sprinkler head is adjacent a walkway or wall.

7 Claims, 5 Drawing Figures

PATENTED JUN 4 1974

GRASS TRIMMER

The present invention relates to vegetation trimming apparatus, and, more particularly, to apparatus for trimming the vegetation adjacent sprinkler heads.

In recent years, it has become quite common for homeowners to install sprinkler systems for watering their lawns and gardens. The sprinkler systems include a plurality of sprinkler heads placed within the yard and adjacent walkways. The sprinkler heads within the yard usually spray water in all directions, while those adjacent the walkways spray water along an arc of less than 360°, usually 180°.

The vertical position of non-removable sprinkler heads is low enough not to impede the normal use of the lawn and are generally low enough not to be readily visible. Each of the sprinkler heads must, of course, be sufficiently high above the ground so that the adjacent soil and vegetation does not impede the water spray.

As the vegetation grows, it will, in due time, be sufficiently high to impede the water spray and must be cut. Most lawn mowers cannot cut the vegetation immediately adjacent the sprinkler heads without creating a serious hazard of damaging them. Therefore, several attempts have been brought forth as solutions to the problem.

The most expeditious solution to the problem is that of stopping the growth of vegetation immediately surrounding the sprinkler head by cutting the vegetation below ground level. The devices disclosed in the following U.S. Pat. Nos. 1,857,383; 3,062,299 and 3,111,995, make a vertical cut about the sprinkler head with a circular cutting blade. In U.S. Pat. Nos. 1,866,073; 3,143,176 and 3,503,448, a circular horizontal below ground level cut is made about a sprinkler head.

All of the above devices suffer from several disadvantages. First, a shroud is employed to fit around the sprinkler head and position the cutter. The shroud shields the vegetation immediately adjacent the sprinkler head and prevents it from being cut. The shielded vegetation can and does interfere with the operation of the sprinkler head. Second, a clear circular space must surround the sprinkler head to permit the cutter to operate. Thus, the cutter cannot be employed where the sprinkler head is adjacent a walkway. Third, none of the cutters include provisions for removing the vegetation adjacent the water pipe connected to the sprinkler head where the sprinkler head is of greater diameter than the water pipe.

It is therefore a primary object of this invention to provide apparatus for trimming vegetation immediately adjacent sprinkler head apparatus.

Another object of the present invention is to provide apparatus for trimming vegetation adjacent sprinkler head apparatus, where said apparatus is adjacent a walkway.

Yet another object of the present invention is to provide a grass trimmer with adjustable blades for varying the diametric size of the swath cut by the blades.

Still another object of the present invention is to provide a grass trimmer with means for varying the depth of the cut.

A further object of the present invention is to provide a grass trimmer having easily removable cutting blades.

A yet further object of the present invention is to provide a manually operated vegetation trimmer for trimming the vegetation adjacent sprinkler heads.

These and other objects of the present invention will become apparent to those skilled in the art as the description thereof proceeds.

The subject matter of the invention is particularly pointed out and distinctly claimed in the concluding portion of the specification. The invention, however, both as to organization and method of operation, may best be understood by reference to the following description taken in connection with the accompanying drawings, of which:

Figure 1:
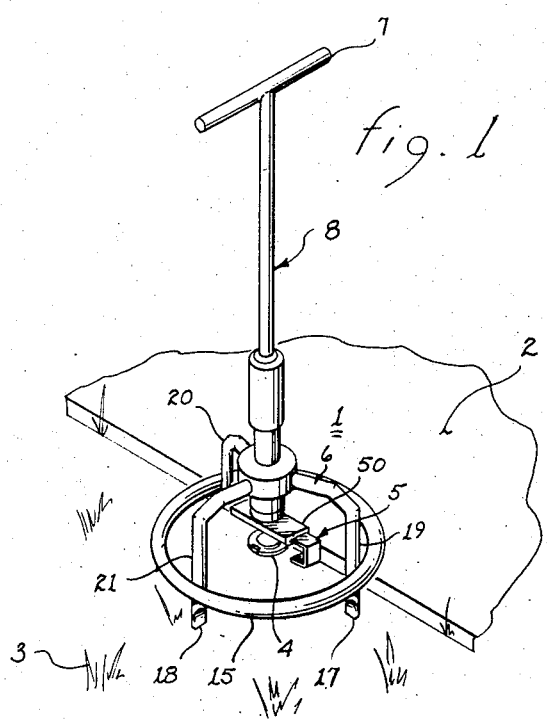
FIG. 1 illustrates the present invention positioned about a sprinkler head where the sprinkler head is adjacent a walkway.

Referring to FIG. 1, there is shown a concrete walkway 2 bordering a plot of grass 3. A plurality of sprinkler heads 4 are positioned within the plot of grass and adjacent the walkway to sprinkle the grass with water. Conventional grass mowers are not adapted nor adaptable to cut the grass immediately adjacent the sprinkler heads, without an attendant hazard to the sprinkler heads. Whether the sprinkler heads are interior to the plot of grass or adjacent a walkway makes little difference. Therefore, the grass remaining about the sprinkler heads must be removed by some other means to prevent the grass from impeding the flow of water from the sprinkler heads. By using a grass trimmer 1, as taught by the present invention, the grass immediately adjacent the sprinkler heads may be removed, regardless of the location of the sprinkler heads.

Figure 2:
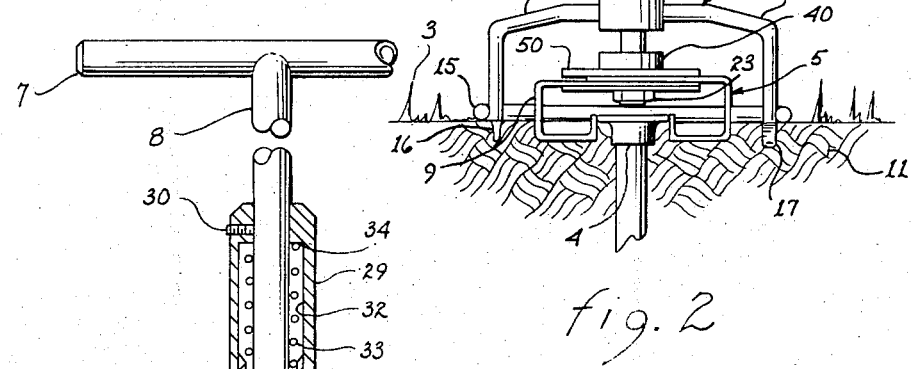
FIG. 2 illustrates a side view of the present invention positioned about a sprinkler head.

Referring now jointly to FIGS. 1 and 2, the grass trimmer 1 includes a generally tubular framework 6, a set of cutting blades 5, a shaft 8 connected to the cutting blades and extending upwardly therefrom terminating at handle 7. A bushing 22 is disposed intermediate tubular framework 6 and shaft 8. The tubular framework 6 includes a circular member 15, which member is positionable adjacent the surface of the ground 11 and supports the grass trimmer 1. A plurality of supports, 19, 20, and 21 are disposed intermediate member 15 and bushing 22. A plurality of prongs 15, 16, and 17, extend downwardly from member 15. These prongs may be the extremities of supports 19, 20, and 21. The purpose of the prongs is that of engaging the ground 11 to prevent unwanted lateral movement of the grass trimmer 1.

The lower extremity of shaft 8 extends through bushing 22 and terminates in a fitting 23, which fitting may be a jam nut and secures the set of cutting blades 5 to shaft 8. Each blade of the set of cutting blades 5 extend laterally, downwardly and inwardly from fitting 23. The inward extremity of each blade of the set of cutting blades 5 may include a lip to facilitate the cutting and removing of the surface soil immediately adjacent sprinkler head 4. The depth of the cut made by the horizontal cutting segment of the set of cutting blades 5 is determined by a cutting depth mechanism to be described below.

In operation, the grass trimmer 1 is positioned so as to encircle and enclose a sprinkler head 4. The exact alignment between the grass trimmer and the sprinkler head can be easily determined by visual inspection because of the open framework 6. When positioned, handle 7, and attached shaft 8, is forced downwardly and rotated. The downward movement causes the set of cutting blades 5 to engage the soil and the rotation of shaft 8 causes the set of cutting blades 5 to rotate. The rotation of the set of cutting blades 5 severs a circular band of top soil about the sprinkler head 4. The severed top soil includes, of course, the grass, other vegetation and attendant roots. Thus, a vegetation free swath is obtained about each sprinkler head.

Where the sprinkler heads are immediately adjacent a walkway, it is generally physically impossible to cut a circular swath about each sprinkler head. At these locations, one of the blades of the set of cutting blades 5 is removed, as will be described in more detail below. The grass trimmer 1 is then positioned with two of the prongs immediately adjacent the walkway such that a portion of member 15 rests upon the surface of the walkway and the remaining portion of the member rests upon the immediately adjacent ground surface.

The remaining single blade 9 of the set of cutting blades 5 is inserted within the soil by forcing handle 7 and shaft 8 downwardly. The single blade 9 is rotated by rotating handle 7 through an arc of less than 360°. The blade rotation will cut a concentric swath about the sprinkler head 4. An angular displacement of the swath is limited only by the proximity of the walkway edge.

Where the surface of walkway 2 is substantially vertically displaced from the plot of grass, or, where a sprinkler head is positioned adjacent a wall, the present invention must be modified to a slight degree. By permanently removing or hingedly attaching segment 14 (see FIG. 4) of circular member 15 intermediate supports 19 and 20, the prongs 16 and 17 may be placed immediately adjacent the edge of the raised walkway or wall. Thus, circular member 15 will not impede the positioning of the cutting blades 9 about a sprinkler head 4, where the sprinkler head is close to the raised walkway or wall.

Figure 3:
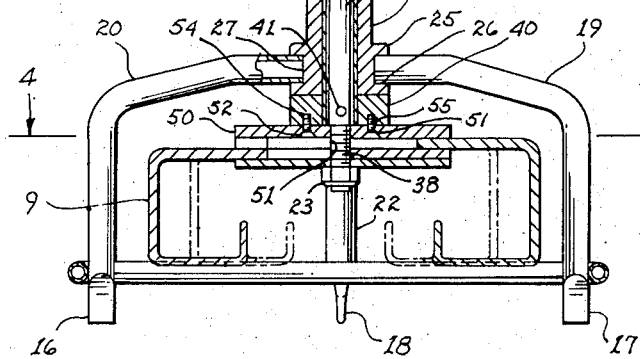
FIG. 3 illustrates a detailed view of the present invention.
Figure 4:
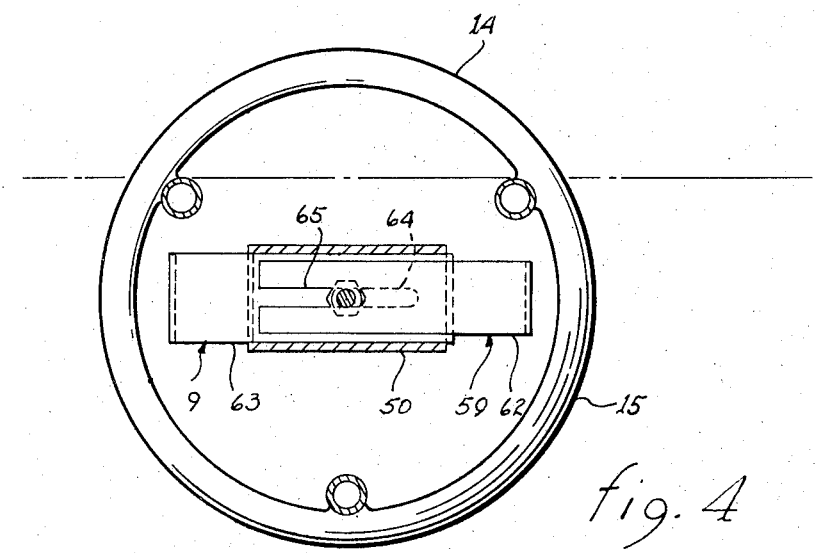
FIG. 4 illustrates a sectional view of the present invention taken along lines 4—4, as shown in FIG. 3.
Figure 5:
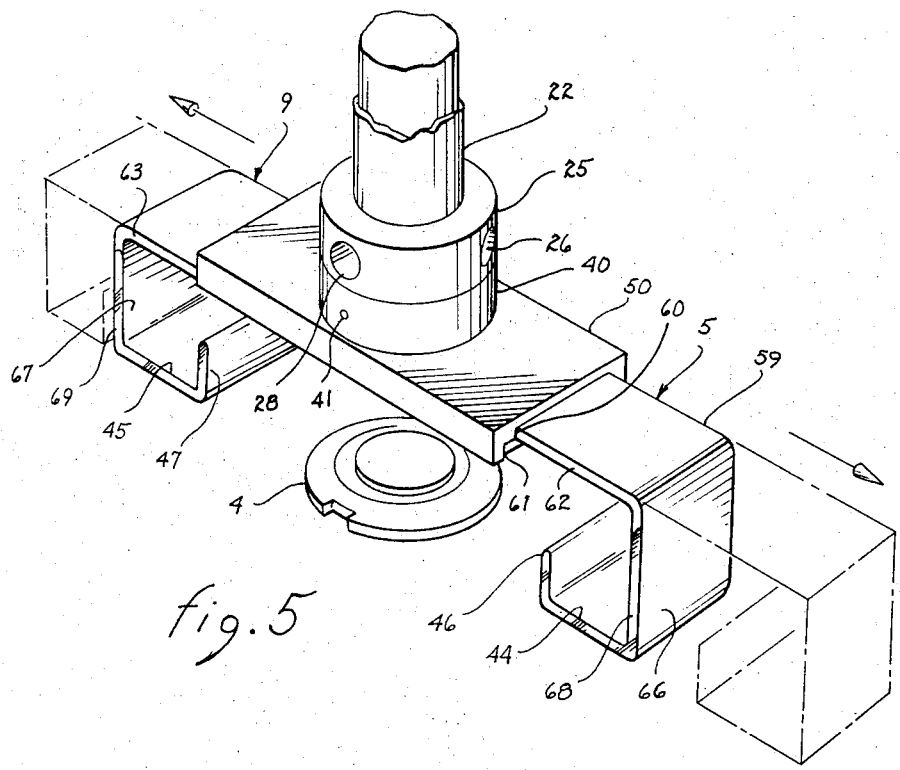
FIG. 5 illustrates an isometric view of the cutting blades.

Referring now to FIGS. 3, 4, and 5, the mechanical details of the grass trimmer 1 will be described in further detail. Shaft 8, which may be a hollow circular shaft as shown, is inserted within bushing 22. The base 25 of the bushing includes a plurality of cavities 26, 27, and 28, each of which receive and retain one end of one of the supports 19, 20, and 21, respectively. A centrally mounted sleeve 29 is positioned at the lower end of shaft 8 and secured thereto by means of a set screw 30. The interior dimension of sleeve 29 is concentric with the exterior dimension of bushing 22 and defines an annular cavity 32. Bushing 22 fits within a portion of cavity 32 in a telesoping manner. An annular cavity 31 is disposed within bushing 22 immediately adjacent the exterior of shaft 8. A coil spring 33 extends from within cavity 31 into cavity 32 and urges sleeve 29 to be telescopically displaced from bushing 22. Thus, when the grass trimmer 1 is not in use, the set of blades 5 will be housed within open framework 6 and protected against damage. The retraction of the set of blades 5 also permits the grass trimmer 1 to be free standing, supported by prongs 16, 17 and 18.

A support member 39, having a threaded shaft 38, is fitted within the hollow extremity of shaft 8 such that the threaded shaft extends exterior therefrom. An apertured circular base 40 fits about the extremity of shaft 8. The base 40, support member 39 and shaft 8 are secured to one another by a shear pin 41 extending therethrough. By this arrangement, it may be understood that the upward movement of shaft 8, as urged by coil spring 33, is limited by base 40 contacting bushing 22. The downward movement of shaft 8 as a result of downward pressure being applied upon handle 7, is limited by bushing 22 contacting the compressed coil spring 33 adjacent end wall 34 of cavity 32. Thus, the depth of cut made by the set of cutting blades 5 can be varied by momentarily loosening set screw 30 and moving sleeve 29 upwardly or downwardly.

Referring in particular to FIGS. 3 and 5, the adjustable feature of the set of cutting blades 5 and their attachment to shaft 8 will be described in further detail. A receiver 50 is positioned adjacent base 40 by inserting threaded shaft 38 through aperture 51. Screws 52 and 53 are inserted through apertures 54 and 55 within receiver 50 and threadedly engage base 40. These screws firmly attach receiver 50 to the base and prevent movement therebetween. A first channel 60 is disposed within receiver 50 along its longitudinal axis. A second channel 61 parallel with and wider than the first channel, is also disposed within receiver 50.

The set of blades 5 include two generally similar opposed individual blades 9 and 59. Each first arm 62, 63 of blades 59 and 9, respectively slidably engages and is supported and guided by one of the channels 60 and 61 of reciever 50. Necessarily, each of the arms must be of a width corresponding to the width of the respective channel engaged. Arm 63 includes an elongated aperture 64, which aperture is wide enough to receive threaded shaft 38. The elongated aperture 64 permits blade 9 to be longitudinally displaced with respect to receiver 50. Arm 62 includes a slot 65, which slot is wide enough to receive threaded shaft 38. Slot 65 permits blade 59 to be longitudinally displaced with respect to receiver 50. Further, the slot 65 permits blade 59 to be disengaged from threaded shaft 38 and be withdrawn from within channel 60 without lifting the blade out of its respective channel. A fitting 23, which fitting may be a jam nut, engages threaded shaft 38. When tightened, the fitting 23 secures the arms 62 and 63 of blades 59 and 9 to receiver 50 to prevent movement of the blades with respect to the receiver.

One of two vertically oriented second arms 66 and 67 depends downwardly from the extremity of each of arms 62 and 63. Second arms 66 and 67 may or may not include a sharpened edge 68 and 69, respectively. A cutting segment 44, 45 extends inwardly from the lower extremity of each of second arms 66 and 67. Each of the cutting segments 44 and 45 are sharpened on either side to permit the segments to cleave the soil. A lip, such as lips 46, 47, may be disposed at the inward extremity of each of cutting segments 44 and 45, respectively. If the lateral edges of the second arms and the lips are sharpened they will cut, rather than tear the vertical boundaries of the swath.

In operation, fitting 23 is loosened to permit blades 59 and 9 to be moved toward or away from each other. The distance between lips 46 and 47 define the inner diameter of the circular swath to be cut. The inner diameter should be approximately equivalent to the base of sprinkler head 4 or the water pipe connected to the sprinkler head in order that the grass and other vegetation immediately adjacent the sprinkler head be severed from the ground by cutting segments 44 and 45. Once the distance between lips 46, and 47 has been determined, fitting 23 is tightened to fixedly secure arms 62 and 63 of blades 59 and 9 within their respective channels in reciever 5. In this manner, the cutting blades 59 and 9 can be adjusted to fit the base of many different types of sprinkler heads.

When only one blade is to be used, blade 59 may be removed by simply loosening fitting 23 and sliding the blade out of its channel within receiver 50. The slot 65 in arm 62 permits the blade 59 to disengage from threaded shaft 38 without lifting the arm over the end of the threaded shaft the remaining blade 9 is radially repositioned with respect to shaft 8 to fit the sprinkler head to be acted upon. Fitting 23 is tightened to secure the blade within its channel in receiver 50. The grass trimmer 1 may now be used to cut the grass and other vegetation about sprinkler heads where the sprinkler heads are so positioned as not to permit a surrounding circular cut.

From a study of the configuration of the blades, as shown, it will become apparent the grass trimmer 1 is emminently capable of severing vegetation in the shadow of the sprinkler head itself. In addition, the radial length of either or both the first arms and the cutting segments may be varied to suit the spray pattern of the sprinkler head. If the spray pattern is more lateral than vertical, the radial length may be increased to provide a wider swath of vegetation free surface. Or, if the spray pattern is essentially vertical, the radial length may be decreased to provide a narrower swath of vegetation free surface and render the sprinkler heads less visually noticeable.

As described above, the diameter of the swath to be cut can be varied by simply loosening the cutting blade fitting. Similarly, one of the blades may be removed by loosening the fitting. By this arrangement, some insurance is afforded against the possible loss of the fitting and attendant decommissioning of the grass trimmer.

While the principles of the invention have now been made clear in an illustrative embodiment, there will be immediately obvious to those skilled in the art many modifications of structure, arrangement, proportions, the elements, materials, and components used in the practice of the invention which are particularly adapted for specific environments and operating requirements without departing from those principles.

I claim:

1. Apparatus for cutting grass and other vegetation adjacent sprinkler heads, said apparatus comprising:
   a. a shaft having an upper and a lower end;
   b. means associated with said upper end for rotating said shaft;
   c. an open framework for receiving said lower end, said framework being positionable adjacent the ground to enclose a sprinkler head;
   d. a bushing disposed intermediate said lower end and said open framework to permit rotation of said shaft with respect to said open framework;
   e. severing means secured to said lower end for cutting the grass and other vegetation, said severing means being positionable along a path concentric with the enclosed sprinkler head, and including:
      1. an apertured receiver connected to said lower end, said receiver including at least one channel;
      2. at least one cutting blade slidably disposed within one of said channels of said receiver;
      3. attachment means extending from said lower end of said shaft through the aperture of said receiver for securing one of said cutting blades within one of said channels; and
   f. means for axially displacing said shaft and said severing means with respect to said open framework; whereby rotation of said shaft combined with a downward vertical movement of said shaft causes said severing means to engage the ground and sever a swath of soil about the sprinkler head and cut the grass and other vegetation adjacent the sprinkler head.

2. The combination set forth in claim 1, wherein said said cutting blade comprises:
   a. a horizontally disposed first arm, said arm including an elongated aperture disposed therein for receiving said attachment means;
   b. a second arm depending downwardly from one extremity of said first arm; and
   c. a cutting segment extending inwardly toward the axis of said shaft from the approximate lower extremity of said second arm; whereby, said cutting segment may be disposed below the top of the sprinkler head without said blade contacting the sprinkler head.

3. The combination set forth in claim 2, wherein said cutting blade further includes an upwardly extending lip disposed at the inward extremity of said cutting edge.

4. The combination set forth in claim 3, wherein said second arm includes sharpened edges.

5. The combination set forth in claim 1, wherein said receiver comprises:
   a. a first channel for receiving a first cutting blade; and
   b. a second channel for receiving a second cutting blade; whereby, said channels, in combination with said elongated aperture, permit said second arm of each said blade to be independently positioned away from or toward said attachment means.

6. The combination set forth in claim 5, further including a threaded fitting engaging said attachment means, said fitting clamping said first and second blades within respective ones of said channels.

7. The combination set forth in claim 6, wherein said elongated aperture within one of said first and second blades comprises a slot; whereby, the blade having said slot may be detached from said attachment means by loosening said fitting.

* * * * *